United States Patent Office 2,721,828
Patented Oct. 25, 1955

2,721,828

PROCESS FOR PRODUCTION OF
17-KETOSTEROIDS

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application October 1, 1953,
Serial No. 383,701

20 Claims. (Cl. 195—51)

The present invention relates to a novel process for the fermentative degradation of the 17-side chain of 20-oxygenated steroids, especially 20-ketosteroids to yield 17-ketosteroids, especially 17-ketoandrostane and 17-ketoetiocholane compounds.

The process of the present invention comprises subjecting a 20-oxygenated steroid, especially a 20-ketosteroid to the action of a fungus of the genus Gliocladium, to produce a 17-ketoandrostane compound.

The process of degradation of the 17-side chain of steroid compounds to give 17-ketosteroids, especially 17-ketoandrostanes and 17-ketoetiocholanes by chemical means is well known, but these procedures usually involve a number of steps such as formation of a 17(20) double bond and oxidation of this double bond. In such oxidative degradation the steroid nucleus is often attacked in other positions, especially double bonds with resulting high losses. In order to avoid such losses, protection of such positions or groups, which involves at least two additional steps, is practiced in the art. For example, Bergmann and Stevens, J. Org. Chem. 13, 10 (1948) show the ozonolysis of 22-enol acetate of 3β-acetoxybisnor-5,7-choladien-22-al protected by a 5,8 maleic anhydride adduct group to yield the maleic anhydride adduct of 3β-acetoxy-5,7-androstadiene-17-one.

It is an object of the present invention to provide a direct method for the degradation of a 17-side chain of 20-oxygenated steroids, especially 20-ketosteroids by the action of a fungus of the genus Gliocladium. Another object of the present invention is the provision of a process for the production of 17-ketoandrostane and 17-ketoetiocholane compounds which are useful in therapy or as intermediates for the synthesis of therapeutically useful products from 20-oxygenated steroids. Other objects and uses of this invention will be apparent to those skilled in the art to which this invention pertains.

The method of the present invention is able to furnish a variety of useful products. For example, progesterone subjected to the action of Gliocladium catenulatum gives 4-androstene-3,17-dione possessing known androgenic properties, and also known 6β-hydroxy-4-androstene-3,17-dione [Balant and Ehrenstein, J. Org. Chem. 17, 1587 (1952)]. The resulting 4-androstene-3,17-dione can be converted to testosterone in accordance with stavely, U. S. Patent 2,288,854, issued October 11, 1941, and the latter by hydrogenation to dihydrotestosterone of therapeutic use (Symposium on Steroids in Experimental and Clinical Practice, The Blakiston Company, New York, 1951, p. 375). The other fermentation product, 6β-hydroxy-4-androstene-3,17-dione, can be oxidized by chromic acid to 4-androstene-3,6,17- trione which possesses estrogenic activity [Butenandt, Ber. 69, 1163 (1936)]. Similarly other physiologically and pharmacologically active 17-ketosteroids or intermediates for the synthesis of such 17-ketosteroids may be obtained by subjecting starting steroids to the fermentation process of this invention. For example, androstane-3,11,17-trione (male hormone activity) may be obtained by fermentation of allopregnane-3,11,20-trione; etiocholane-3,11,20-trione (general anesthetic activity) from pregnane-3,11,20-trione; 3α- or 3β-hydroxyeticholane-17-one (anesthetic activity) from the fermentation of 3α- or 3β-hydroxypregnane-20-one or from pregnane-3,20-dione by the side chain fermentation of this invention and subsequent reduction with sodium borohydride or lithium aluminum hydride; etiocholane-3,6,17-trione (which may be brominated to 4-bromoetiocholane-3,6,17-trione and dehydrobrominated to give 4-androstene-3,6,17-trione of estrogenic activity) from pregnane-3,6,20-trione by side chain fermentation; adrenosterone from the fermentation of 11-ketoprogesterone, cortisone or cortisone acetate; and other like active 17-ketosteroids.

The starting steroid compounds of the present application are the 20-oxygenated steroids, and preferably the 20-hydroxy steroids and the 20-ketosteroids. The cyclopentanopolyhydrophenanthrene radical with a 17β-side chain may possess keto groups or hydroxy groups in other positions, especially positions 3, 6, 7, 8, 11, 12, 14, 17, and 21, and may have double bonds in various positions especially in positions 4 and 5. Representative starting materials include: 3α- and 3β-hydroxypregnane-20-one, 3α- and 3β-hydroxy-5-pregnene-20-one, 3α- and 3β-hydroxypregnane-11,20-dione, 3α,11α-, 3α,11β-, 3β,11α- and 3β,11β-dihydroxypregnane-20-one, progesterone, 11-ketoprogesterone, 11α-hydroxyprogesterone, 11α-acetoxyprogesterone, 11β-hydroxyprogesterone, 14α-hydroxyprogesterone, 14α,17α,21-trihydroxy-4-pregnene-3,20-dione, 14α,17α-dihydroxy-21-acetoxy-4-pregnene-3,20-dione, 11α,17α-dihydroxyprogesterone, 17α-hydroxy-11-ketoprogesterone, 3β,17α,20-allo-pregnanetriol (Reichstein's compound "O"); 17α,21-dihydroxy-4-pregnene-3,20-dione (Reichstein's compound "S"), corticosterone, cortisone, cortisone acetate, dihydrocortisone (Kendall's compound "F") and 11α,17α,21-trihydroxy-4-pregnene-3,20-dione (11-epi "F") pregnane-3,11,20-trione, 17α-hydroxypregnane-3,11,20-trione, pregnane-3,12,20-trione, pregnane-3,20-dione, 17α-hydroxypregnane-3,20 - dione, allopregnane-3,11,20-trione, allopregnane-3,20-dione, 3α-hydroxy-5-pregnene-20-one, 3α- and 3β-hydroxyallopregnane-20-one, 3α,12α,21-trihydroxypregnane-20-one, 3α,17α-dihydroxypregnane-20-one, 6α- and 6β-hydroxyprogesterone, pregnane-3,6,20-trione, 21-methylprogesterone, 21-ethylprogesterone, 3β,20-dihydroxy-20-methylallopregnane, 3β,20-dihydroxy-20-methyl-5-pregnane, 3β,20,21-trihydroxy-20-methyl-5-pregnene, 3β-hydroxy-21-ethyl-5-pregnene-20-one, 3β,17α-dihydroxy-17β-(1,2,3-trihydroxypropyl)-androstane, and the like.

In carrying out the process of the present invention the selected 20-ketosteroid, suitably in a solvent, for example, is subjected to a growth of a species of fungus of the genus Gliocladium. The genus Gliocladium belongs to the family Aspergillaceae of the order Plectascineae of the class Ascomycetes. The classification and definition of Gliocladium as herein employed is that of Raper, K. B., and Thom C., "A Manual of the Penicillia," Williams and Wilkins Company, Baltimore, 1949. Among species of the genus Gliocladium useful in the fermentation of steroids may be mentioned the Gliocladium roseum series, Gliocladium roseum, Gliocladium penicilloides, Gliocladium vermoesceni (i. e., ATCC 10522); Gliocladium catenulatum series, Gliocladium catenulatum, Gliocladium fimbriatum; Gliocladium deliquescens series, Gliocladium deliquescens (i. e., ATCC 10097),

*Gliocladium nigro-virescens* (C. B. S. v. Beijma Holland); *Gliocladium luteolum*, *Gliocladium flavum*, *Gliocladium cibotii* and *Gliocladium viride*. Of these species, especially preferred for the practice of the present invention are *Gliocladium catenulatum*, American Type Culture Collection Number 10,523, *Gliocladium roseum*, American Type Culture Collection Number 10,521, *Gliocladium deliquescens* (Centraalbureau voor Schimmelcultur, Baarn, Holland) and *Gliocladium luteolum* (Centraalbureau voor Schimmelcultur Baarn, Holland).

Culture of the fungi, for the purpose and practice of the present invention, is in or on a medium favorable to the development of the fungi. Solid media may be utilized, but the preferred media are those which permit quantity growth under aerobic conditions. Moist solid particulate media, such as bran, cereal grains, cereal grits, wood chips, shavings, sawdust, cornhusks, fibrous material, such as copra, chestnuts, or lupine seeds may be used. These can be extracted with alcohol, ether or other organic solvents, to remove objectionable contaminants and growth inhibitors prior to fermentation. The carriers may optionally contain added growth factors and nutrients and may be used in layers or trays with or without auxiliary aeration, in towers as in the vinegar process or under conditions of agitation as for example by tumbling in a rotating drum. Liquid media, illustratively brewer's wort, are well adapted to use under aerobic layer or more especially aerobic submerged fermentation conditions. Suitably the media should contain sources of available carbon, nitrogen and minerals although of course there can be significant growth and development under less than optimum conditions.

Available carbon may be from carbohydrates, starches, gelatinized starches, dextrin, sugars, molasses as of cane, beet and sorghum, glucose, fructose, mannose, galactose, maltose, sucrose, lactose, pentoses, amino acids, peptones or proteins. Carbon dioxide, glycerol, alcohols, acetic acids, sodium acetate, citric acid, sodium citrate, lower fatty acids, higher fatty acids, or fats are illustrative of other materials which provide assimilable carbon for the energy requirements of the fungi. Mixtures of various carbon sources are sometimes advantageous.

Nitrogen in assimilable form may be provided by soluble or insoluble vegetable or animal proteins, soybean meal, lactalbumin, casein, egg albumin, peptones, polypeptides or amino acids, urea, ammonium salts, ammonia trapped on base exchange resins or on zeolites, ammonium chloride, sodium nitrate, potassium nitrate, or morpholine. Whey, distillers solubles, corn steep liquor, or yeast extract have been useful.

As mineral constituents the media or menstruum may contain, naturally present or added, available aluminum, calcium, chromium, cobalt, copper, gallium, iron, magnesium, molybdenum, potassium, scandium, uranium and vanadium. Sulfur may be provided by sulfates, alkyl sulfonates, sulfoxylates, sulfamates, sulfinates, free sulfur, hyposulfite, persulfate, thiosulfate, methionine, cystine, cystein, thiamin or biotin. Phosphorus, preferably pentavalent, suitably in a concentration at or about 0.001 to 0.07 molar and particularly at or about 0.015 to 0.02, may be present, suitably as ortho-, meta-, or pyrophosphates, salts or esters, phytin, phytic acid, phytates, glycerophosphate, sodium nucleinate, and/or corn steep liquor, casein or ovovitellin. Boron, iodine and selenium in traces may be advantageous. Desirably boron, in the form of boric acid or sodium borate may be present or added especially after germination and early growth of the fungus.

Other accessory growth factors, vitamins, auxins and growth stimulants may be provided as needed or desired.

While solid of liquid media may be utilized, a liquid medium is preferred as it favors mycelial growth.

Suspending or mycelial carriers such as filter earths, filter aids, finely divided cellulose, wood chips, bentonite, calcium carbonate, magnesium carbonate, charcoal, activated carbon or other suspendable solid matter, methyl cellulose, carboxymethyl cellulose or alginates may be added to facilitate fermentation, aeration and filtration.

The selected species of fungus is grown on a medium suitably containing assimilable non-steroidal carbon, illustratively carbohydrates, such as sugar or starches; assimilable nitrogen, illustratively soluble or insoluble proteins, peptones or amino acids; and mineral constituents, illustratively phosphates and magnesium sulfate; and other art recognized, desirable additions. The medium may desirably have a pH before inoculation of between about 4 to 7 although a higher or lower pH may be used. A pH of between about 5 and about 6 is preferred for the growth of Gliocladium.

Inoculation of the fungal growth-supporting medium with the selected fungus of the genus Gliocladium may be accomplished in any suitable manner. Gliocladium grow over a range from about twenty to about 38 degrees centigrade, with a temperature between about 25 to about 35 degrees preferred.

The developmental period of fungal growth required before the steroid to be fermented is exposed to the fungus does not appear to be critical. For example, the steroid may be added either before thermal or other sterilization of the medium, at the time of inoculating the medium with the selected Gliocladium species, or at some time, for example, 24 or 40 hours, later. The steroid to be fermented may be added at any suitable concentration although for practical reasons steroid substrate at a concentration of about or up to about 0.6 gram per liter or even 0.8 gram per liter of medium is satisfactory and two grams per liter is operative although higher concentration, depending on the particular steroid, may be used with some inhibition of mycelial development. The addition of steroid substrate to be fermented may be accomplished in any suitable manner especially so as to promote a large surface of contact of the steroid substrate with the fungus, such as by dispersing the steroid substrate, either alone, with a dispersing agent, or in solution in an organic solvent by mixing or homogenizing a steroid substrate with a fungal medium to form a suspension or dispersion of steroid. Either submerged or surface culture procedures may be used with facility, although submerged culture is preferred. Alternatively, steroid fermenting enzymes of a growth of the fungus may be separated from the fungus or medium, admixed with the steroid or a solution or dispersion thereof, and the mixture subjected to aerobic conditions to accomplish fermentation of the steroid.

The temperature during the period of fermentation of the steroid may be the same as that found suitable for fungal growth. It need be maintained only within such range as supports life, active growth, or the enzyme activity of the fungus.

While any form of aerobic incubation is satisfactory for the growth of the selected fungus and fermentation of the steroid substrate, the efficiency of steroid fermentation is related to aeration. Therefore, aeration is usually controlled, as by agitation and/or blowing air through the fermentation medium. Aeration may be effected by surface culture or under submerged fermentation conditions. Aerobic conditions include not only the use of air to introduce oxygen, but also other sources or mixtures containing oxygen in free or liberatable form. In using air as the aerating medium, a desirable rate of aeration is about four to twenty millimoles and particularly about six millimoles of oxygen per hour per liter as determined by the method of Cooper, Fernstrom and Miller, Ind. Eng. Chem. 36, 504 (1944). Aeration is suitably modified by using superatmospheric or subatmospheric pressures, for example, thirty pounds per square inch or ten pounds per square inch absolute. Oxygen uptake may be facilitated by the presence of various agents such as ascorbic acid, glutamic acid, citric acid, lactic acid, tyrosine, or tryptophane.

The time required for the fermentation of steroid varies somewhat with the procedure. When the steroid substrate is present at the time of inoculation of the medium, periods of from eight to 72 hours may be used. However, when the steroid is added to the fungus, after substantial aerobic growth of the fungal organism, for example, after 16 to 24 hours at optimum temperature, the conversion of steroid substrate begins immediately and high yields are obtained in from one to 72 hours, 24 hours being generally satisfactory.

After completion of the steroid fermentation, the resulting fermented steroid is recovered from the fermentation reaction mixture. An especially advantageous manner of recovering the fermented steroid involves extracting the fermentation reaction mixture, including the fermentation liquor and mycelia with a water-immiscible organic solvent for steroids, for example, methylene chloride, chloroform, carbon tetrachloride, ethylene chloride, trichloroethylene, ether, amyl acetate, benzene, and the like. The fermentation liquor and mycelia may be separated and then separately extracted with suitable solvents. The mycelia may be extracted with either water miscible or water-immiscible solvents, acetone being effective. The fermentation liquor, freed of mycelia, may be extracted with water-immiscible solvents. The extracts can be combined, either before or after washing with an alkaline solution, illustratively sodium bicarbonate; suitably dried, as for example over anhydrous sodium sulfate; and the purified fermented steroid obtained by recrystallization from organic solvents or by chromatography to isolate the 17-ketosteroids from the other fermentation products.

The following examples are illustrative of the process of the present invention and are not to be construed as limiting.

*Example 1.—Fermentation of progesterone and isolation of 4-androstene-3,17-dione and 6β-hydroxy-4-androstene-3,17-dione*

A medium was prepared of twenty grams of Edamine enzymatic digest of lactalbumin, three grams of corn steep liquor, and fifty grams of technical dextrose diluted to one liter with tap water and adjusted to a pH of 5.85. Twelve liters of this sterilized medium was inoculated with *Gliocladium cantenulatum*, American Type Culture Collection No. 10523, and incubated for 48 hours at a temperature of 26 degrees centigrade using a rate of aeration and stirring such that the oxygen uptake was 6.3 to 7 millimoles per hour per liter of $Na_2SO_3$, according to the method of Cooper, Fernstrom and Miller, Ind. Eng. Chem. 36, 504 (1944). To this medium containing a 48 hour growth of *Gliocladium catenulatum* was added three grams of progesterone in fifty milliliters of acetone to provide a suspension of the steroid in the culture. After an additional 24 hour period of incubation under the same conditions of temperature and aeration, the beer and mycelium were separated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate. The mixed extract and beer filtrate were extracted successively with two one-half volume portions of methylene chloride and then with two one-fourth volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was distilled from the filtrate. The residue thus obtained weighed eight grams and was redissolved and chromatographed over 150 grams of alumina using 300 milliliter portions of solvent as indicated in Table I.

TABLE I

| Fraction | Solvent | Eluate solids, milligrams |
|---|---|---|
| 1 | benzene | 257 |
| 2 | do | 48 |
| 3 | benzene-ether 19:1 | 144 |
| 4 | do | 67 |
| 5 | benzene-ether 9:1 | 0 |
| 6 | do | 53 |
| 7 | benzene-ether 1:1 | 175 |
| 8 | do | 993 |
| 9 | ether | 1,794 |
| 10 | do | 712 |
| 11 | ether-chloroform 19:1 | 268 |
| 12 | do | 131 |
| 13 | ether-chloroform 9:1 | 67 |
| 14 | do | 56 |
| 15 | ether-chloroform 1:1 | 73 |
| 16 | do | 73 |
| 17 | do | 49 |
| 18 | do | 22 |
| 19 | chloroform | 10 |
| 20 | do | 2 |
| 21 | do | 3 |
| 22 | do | 2 |
| 23 | chloroform-acetone 19:1 | 4 |
| 24 | acetone | 16 |
| 25 | methanol | 103 |
| 26 | do | 9 |

Fraction 7 was evaporated and the thus obtained crystals were twice recrystallized from one milliliter of methanol to yield 102 milligrams of 4-androstene-3,17-dione, melting point 169 to 171 degrees centigrade.

Analysis: Calculated for $C_{19}H_{26}O_2$: C, 79.68; H, 9.15. Found: C, 79.53; H, 8.84.

Fractions 8 and 9 (254.9 milligrams) were rechromatographed over 12 grams of alumina using 25-milliliter portions of solvent as indicated in Table II.

TABLE II

| Fraction | Solvent | Eluate solids, milligrams |
|---|---|---|
| 1 | benzene-ether 1:1 | 0. |
| 2 | do | 50.8 |
| 3 | ether | 124.7 |
| 4 | do | 17.6 |
| 5 | ether-chloroform 9:1 | 3.2 |
| 6 | do | 0.7 |
| 7–18 | ether-chloroform mixtures; chloroform; acetone. | 0.5 |
| 19 | methanol | 3.4 |

The fractions 2, 3, and 4 were evaporated to yield 193.1 milligrams of crystals which were shown by infrared spectrum and papergram studies to contain 6β-hydroxy-4-androstene-3,17-dione. To isolate the 6β-hydroxy-4-androstene-3,17-dione the combined fractions 2 to 4 were dissolved in five milliliters of acetone, filtered and evaporated to two milliliters. Upon the addition of 3 milliliters of Skellysolve B (a mixture of hexanes), 38 milligrams of crystals A of melting point 184–290 degrees centigrade were recovered. The second crop of crystals B 50 milligrams and a third crop of crystals C were obtained from the mother liquors by refrigeration over night. Crystals B and C were combined, dissolved in four milliliters of ethyl acetate, filtered, and evaporated to one milliliter. Upon the addition of 2.5 milliliters Skellysolve B and refrigeration over night, 42.8 milligrams of crystals D of melting point 176 to 185 degrees centigrade were recovered by filtration. This product D was recrystallized from ethyl acetate and Skellysolve B as above to yield 30.4 milligrams of crystals E, of melting point 186 to 188 degrees centigrade. Crystals A, 38 milligrams and crystals E, 30.4 milligrams, were dissolved in four milliliters of ethyl acetate, combined and evaporated to one milliliter. Upon the addition of five drops of Skellysolve B, crystals were formed. After 45 minutes at room temperature, followed by filtration, 43.6 milligrams of 6β-hydroxy-4-androstene-3,17-dione were obtained.

Analysis: Calculated for $C_{19}H_{26}O_3$: C, 75.46; H, 8.67. Found: C, 75.39; H, 8.47.

*Example 2.—Fermentation of 11-desoxycorticosterone*

In the same manner as given in Example 1, using *Gliocladium catenulatum*, American Type Culture Collection No. 10523, and 11-desoxycorticosterone as a starting steroid produced 4-androstene-3,17-dione and 6β-hydroxy-4-androstene-3,17-dione.

*Example 3.—Fermentation of 11-desoxycorticosterone acetate*

In the same manner as given in Example 1, using *Gliocladium roseum*, American Type Culture Collection No. 10521, and 11-desoxycorticosterone acetate produced 4-androstene-3,17-dione and 6β-hydroxy-4-androstene-3,17-dione. Similarly, other esters of 11-desoxycorticosterone illustratively the propionate, butyrate, isobutyrate, valerate, hexanoate, benzoate, and phenylacetate yield 4-androstene-3,17-dione and 6β-hydroxy-4-androstene-3,17-dione upon treatment with a fungus of the genus Gliocladium.

*Example 4.—Fermentation of 11-desoxycorticosterone acetate*

In the same manner as given in Example 1, using *Gliocladium deliquescens*, Centraalbureau voor Schimmelcultur, Baarn, Holland, and 11-desoxycorticosterone acetate produced 4-androstene-3,17-dione and 6β-hydroxy-4-androstene-3,17-dione.

Similarly, other esters of 11-desoxycorticosterone, illustratively the propionate, butyrate, isobutyrate, valerate, hexanoate, benzoate, and phenylacetate yield 4-androstene-3,17-dione and 6β-hydroxy-4-androstene-3,17-dione upon treatment with *Gliocladium deliquescens*.

*Example 5.—Fermentation of 11-desoxycorticosterone acetate*

In the same manner as given in Example 1, using *Gliocladium luteolum*, Centraalbureau voor Schimmelcultur, Baarn, Holland and 11-desoxycorticosterone propionate produced 4-androstene-3,17-dione and 6β-hydroxy-4-androstene-3,17-dione. Similarly, other esters of 11-desoxycorticosterone, illustratively the propionate, butyrate, isobutyrate, valerate, hexanoate, benzoate, and phenylacetate yield 4-androstene-3,17-dione and 6β-hydroxy-4-androstene-3,17-dione upon treatment with *Gliocladium luteolum*.

*Example 6.—Fermentation of 11-ketoprogesterone*

In the same manner as given in Example 1, using *Gliocladium catenulatum*, ATCC 10523, and 11-ketoprogesterone produced 4-androstene-3,11,17-trione (adrenosterone).

*Example 7.—Fermentation of 21-methylprogesterone*

In the same manner as given in Example 1 using *Gliocladium catenulatum*, ATCC 10523, and 21-methylprogesterone produced 4-androstene-3,17-dione.

*Example 8.—Fermentation of Reichstein's Compound "O" (3β,17α,20-allopregnanetriol)*

In the same manner as given in Example 1, using *Gliocladium roseum*, ATCC 10521, and 3β,17α,20-allopregnanetriol, produced 3-hydroxyandrostane-17-one.

*Example 9.—Fermentation of 3β,20-dihydroxy-20-methyl-5-pregnene*

In the same manner as given in Example 1, using *Gliocladium catenulatum*, ATCC 10523, and 3β,20-dihydroxy-20-methyl-5-pregnene produced 3β-hydroxy-5-androstene-17-one.

*Example 10.—Fermentation of pregnane-3,6,20-trione*

In the same manner as given in Example 1, using *Gliocladium catenulatum*, ATCC 10523, and pregnane-3,6,20-trione produced etiocholane-3,6,17-trione.

*Example 11.—Fermentation of 6β-hydroxyprogesterone*

In the same manner as given in Example 1, using *Gliocladium catenulatum*, ATCC 10523, and 6β-hydroxyprogesterone produced 6β-hydroxy-4-androstene-3,17-dione.

*Example 12.—Fermentation of pregnane-3,20-dione*

In the same manner as given in Example 1, using *Gliocladium catenulatum*, ATCC 10523, and pregnane-3,20-dione produced etiocholane-3,17-dione.

*Example 13.—Fermentation of allopregnane-3,11,20-trione*

In the same manner as given in Example 1, using *Gliocladium catenulatum*, ATCC 10523, and allopregnane-3,11,20-trione produced androstane-3,11,17,trione.

*Example 14.—Fermentation of Reichstein's compound S (17α,21-dihydroxy-4-pregnene-3,20-dione)*

In the same manner as given in Example 1, using *Gliocladium catenulatum*, ATCC 10523, and Reichstein's compound S (17α,21-dihydroxy-4-pregnene-3,20-dione) produced 4-androstene-3,17-dione and 6β-hydroxy-4-androstene-3,20-dione.

*Example 15.—Fermentation of cortisone*

In the same manner as given in Example 1, using *Gliocladium catenulatum*, ATCC 10523, and cortisone produced 4-androstene-3,11,17-trione (andrenosterone).

*Example 16.—Fermentation of cortisone acetate*

In the same manner as given in Example 1, using *Gliocladium catenulatum*, ATCC 10523, and cortisone acetate produced 4-androstene-3,11,17-trione.

*Example 17.—Fermentation of 11α,17α,21-trihydroxy-4-pregnene-3,20-dione*

In the same manner as given in Example 1, using *Gliocladium catenulatum*, ATCC 10523 and 11α,17α,21-trihydroxy-4-pregnene-3,20-dione produced 11α-hydroxy-4-androstene-3,17-dione.

*Example 18.—Fermentation of 3β-hydroxy-21-ethyl-5-pregnene-20-one*

In the same manner as given in Example 1, using *Gliocladium catenulatum*, ATCC 10523, and 3β-hydroxy-21-ethyl-5-pregnene-20-one produced 3β-hydroxy-5-androstene-17-one.

It is to be understood that the invention is not to be limited to the exact details of the procedure shown and described as obvious modifications and equivalents will be apparent to one skilled in the art, and the invention is therefore to be limited only by the scope of the appended claims.

We claim:

1. A process for the production of a 17-ketosteroid, which comprises: growing a fungus of the genus Gliocladium under aerobic conditions, in the presence of a nutrient medium and a 20-oxygenated steroid selected from the group consisting of 20-ketosteroids and 20-hydroxysteroids.

2. A process for the production of a 17-ketosteroid, which comprises: growing a fungus of the genus Gliocladium under aerobic conditions, in the presence of a nutrient medium containing assimilable non-steroidal carbon and a 20-oxygenated steroid selected from the group consisting of 20-ketosteroids and 20-hydroxysteroids and recovering the resulting 17-ketosteroid.

3. A process for the production of a 17-ketosteroid, which comprises: growing a fungus of the genus Gliocladium under aerobic conditions with agitation in the presence of a nutrient medium containing assimilable non-steroidal carbon, nitrogen and phosphorus and a Δ⁴-20- oxygenated steroid selected from the group consisting of 20-ketosteroids and 20-hydroxysteroids and recovering the resulting 17-ketosteroid.

4. A process for the production of a 3,17-diketosteroid, which comprises: growing a fungus of the genus Gliocladium under aerobic conditions and with agitation in the presence of a nutrient medium containing assimilable carbohydrate, nitrogen and phosphorus and a 3,20-diketosteroid and separating the thus-produced 3,17-diketosteroid.

5. A process for the production of a 17-ketosteroid which comprises: growing a fungus of the genus Gliocladium under aerobic, submerged conditions in the presence of a nutrient medium containing assimilable carbohydrate, nitrogen and phosphorus and a 20-ketosteroid and recovering the thus-produced 17-ketosteroid.

6. A process for the production of a 17-ketosteroid which comprises: growing a fungus of the genus Gliocladium under aerobic conditions, with agitation, in the presence of a nutrient medium containing assimilable non-steroidal carbon, nitrogen and phosphorus and a 20-ketosteroid and isolating the resulting 17-ketosteroid.

7. A process for the production of a 17-ketosteroid which comprises: growing a fungus of the genus Gliocladium under aerobic, submerged conditions in the presence of a nutrient medium containing assimilable non-steroidal carbon, nitrogen and phosphorus and a 20-ketosteroid and extracting the resulting 17-ketosteroid.

8. A process for the production of a 17-ketosteroid which comprises: growing a fungus of the genus Gliocladium under aerobic, submerged conditions with agitation, in the presence of a nutrient medium containing assimilable non-steroidal carbon, nitrogen and phosphorus and a 20-ketosteroid and recovering the resulting 17-ketosteroid.

9. A process for the production of a 17-keto-4-androstene which comprises: growing a fungus of the genus Gliocladium under aerobic conditions with agitation in the presence of a nutrient medium containing assimilable non-steroidal carbon, nitrogen and phosphorus and a $\Delta^4$-20-oxygenated steroid selected from the group consisting of 20-ketosteroids and 20-hydroxysteroids and recovering a resulting 17-keto-$\Delta^4$-androstene.

10. A process for the production of a 4-androstene-3,17-dione which comprises: growing a fungus of the genus Gliocladium under aerobic conditions with agitation in the presence of a nutrient medium containing assimilable non-steroidal carbon, nitrogen and phosphorus, and a 3-keto-$\Delta^4$-20-oxygenated steroid selected from the group consisting of 20-ketosteroids and 20-hydroxysteroids and recovering a thus-produced 4-androstene-3,17-dione.

11. A process for the production of a 4-androstene-3,17-dione which comprises: growing a fungus of the species Gliocladium catenulatum under aerobic, submerged conditions with agitation in the presence of a fermentation medium containing assimilable carbohydrate, nitrogen and phosphorus and a 3,20-diketo-$\Delta^4$-steroid and recovering a thus-produced 4-androstene-3,17-dione.

12. The process of claim 11 wherein the 3,20-diketo-$\Delta^4$-steroid is selected from the group consisting of progesterone, 11-desoxycorticosterone and 21-carboxylic acid esters of 11-desoxycorticosterone.

13. A process for the production of a 17-ketoandrostane which comprises: growing a fungus of the genus Gliocladium under aerobic conditions in the presence of a nutrient medium containing assimilable non-steroidal carbon and 20-oxygenated allo steroid selected from the group consisting of 20-ketosteroids and 20-hydroxysteroids and recovering a thus-produced 17-ketoandrostane.

14. A process for the production of a 17-ketoandrostane which comprises: growing Gliocladium catenulatum under aerobic, submerged conditions and with agitation in the presence of a nutrient medium containing assimilable carbohydrate, nitrogen and phosphorus and a 20-ketoallopregnane and recovering a thus-produced 17-ketoandrostane.

15. A process for the production of androstane-3,11,17-trione which comprises: growing Gliocladium catenulatum under aerobic conditions and with agitation in the presence of a nutrient medium containing assimilable carbohydrate, nitrogen and phosphorus and allopregnane-3,11,17-trione, and recovering a thus-produced 17-ketoandrostane.

16. A process for the production of a 17-ketoetiocholane which comprises: growing a fungus of the genus Gliocladium under aerobic conditions in the presence of a nutrient medium containing assimilable non-steroidal carbon and a 20-oxygenated steroid selected from the group consisting of 20-ketosteroids and 20-hydroxysteroids of the normal series and recovering a thus-produced 17-ketoetiocholane.

17. A process for the production of a 17-ketoetiocholane which comprises: growing Gliocladium catenulatum under aerobic conditions and with agitation in the presence of a nutrient medium containing assimilable carbohydrate, nitrogen and phosphorus and a 20-ketopregnane and recovering a thus-produced 17-ketoetiocholane.

18. A process for the production of an etiocholane-3,17-dione which comprises: growing a fungus of the species Gliocladium catenulatum under aerobic conditions and with agitation in the presence of a nutrient medium containing assimilable carbohydrate, nitrogen and a pregnane-3,20-dione and recovering a thus-produced etiocholane-3,17-dione.

19. A process for the production of an etiocholane-3,6,17-trione which comprises: growing a fungus of the species Gliocladium catenulatum under aerobic conditions in the presence of a nutrient medium containing assimilable non-steroidal carbon and a pregnane-3,6,20-trione and recovering a thus-produced etiocholane-3,6,17-trione.

20. A process for the production of etiocholane-3,6,17-trione which comprises: growing a fungus of the species Gliocladium catenulatum under aerobic conditions with agitation in the presence of a nutrient medium containing assimilable carbohydrate, nitrogen and phosphorus and pregnane-3,6,20-trione and recovering the thus-produced etiocholane-3,6,17-trione.

References Cited in the file of this patent

UNITED STATES PATENTS 2,649,400   Murray et al. _____ Aug. 18, 1953